C. W. HAZELETT.
DRY CELL.
APPLICATION FILED MAY 9, 1919.
1,316,233.  Patented Sept. 16, 1919.
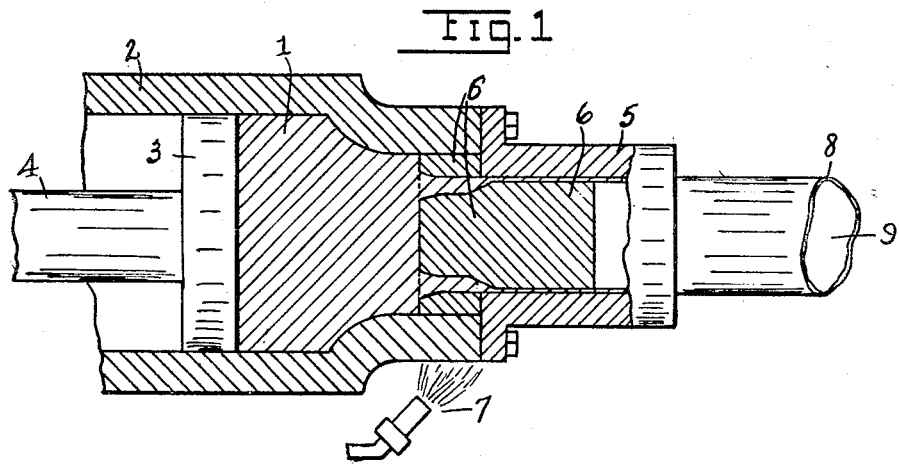
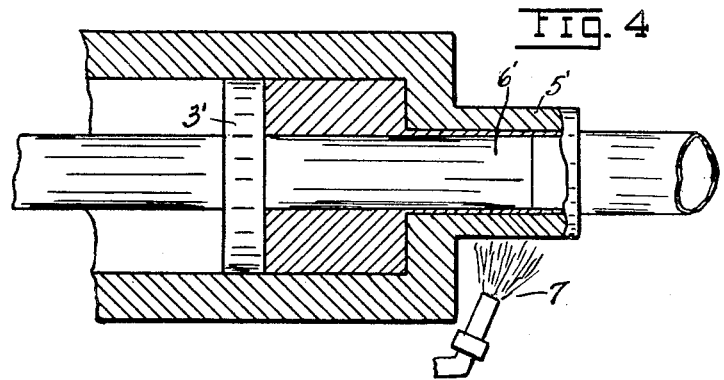
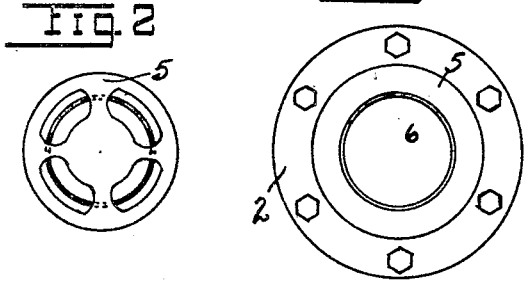
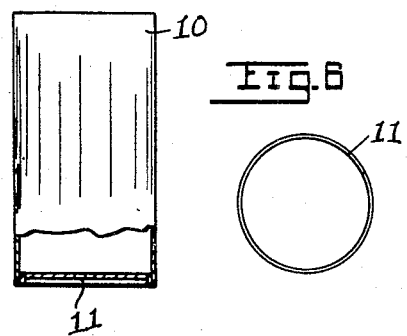
INVENTOR
C. W. HAZELETT
BY
Ira J. Adams.
ATTORNEY

UNITED STATES PATENT OFFICE.

CLARENCE W. HAZELETT, OF LAKEWOOD, OHIO, ASSIGNOR TO NATIONAL CARBON COMPANY, INC., A CORPORATION OF NEW YORK.

DRY CELL.

1,316,233.  Specification of Letters Patent.  Patented Sept. 16, 1919.

Application filed May 9, 1919. Serial No. 295,986.

*To all whom it may concern:*

Be it known that I, CLARENCE W. HAZELETT, a citizen of the United States, residing at Lakewood, in the county of Cuyahoga and State of Ohio, have invented a certain new and useful Improvement in Dry Cells, of which the following is a full, clear, and exact description.

This invention relates to the formation of containers for dry cells.

As is well known, containers for dry cells consist of zinc cans formed by bending a sheet of zinc into tubular shape with overlapped side edges, soldering the overlapped portions together and then soldering a bottom to the can. This is a more or less troublesome operation in practice, and it is difficult to do the soldering without leaving small openings that will permit the electrolyte to escape when the electrolyte mix is placed in the cell. This is particularly true of the soldered joint along the side of the zinc can. I have devised a method for making seamless zinc cans for dry cell use, which will now be described, reference being had to the drawings in which:

Figure 1 illustrates a hydraulic press adapted to form the containers.

Fig. 2 is an end view of the core pin.

Fig. 3 is an end view of the die shown in Fig. 1.

Fig. 4 is a cross section of a modified form of hydraulic press.

Fig. 5 is a partial section of a zinc can with attached bottom made in accordance with my method.

Fig. 6 is a view of the can bottom shown in Fig. 3.

Referring to the drawings, I place a mass of zinc 1 inside a suitable jumbo or hydraulic cylinder 2 having a piston or ram 3 adapted to apply pressure to the zinc by suitable hydraulic means (not shown) through the piston rod 4. The cylinder 2 has a suitable die 5 with a bore of the size of the tube to be extruded therefrom, and a pin or core member 6 attached to the surrounding die by a suitable spider connection as shown in Fig. 2. In Fig. 4 I have shown a modified extrusion apparatus in which the core pin 6' is attached to the ram 3' and projects through the die 5'. The die in either case is heated to a temperature that will permit the zinc to flow more readily. The heating may be carried on by any means, but I have shown somewhat conventionally a gas burner arranged with a flame 7 playing on the die. When the die has been raised to the desired temperature, pressure is applied to the piston head 3 and the zinc 1 is extruded into tubular form as shown at 8, the end being broken away at 9 to readily portray to the eye the shape of the extruded zinc. The tubes may be formed into any desired length and later cut into sections of the right length for dry cell cans, such as shown at 10 in Fig. 5, or the tubes may be cut into these lengths by hand means or otherwise, while they are being extruded through the die.

When the tubes have been cut into appropriate lengths, bottoms may be attached at one end and soldered in position to complete the can. These bottoms may be of any suitable shape, but in Fig. 5 I have shown a flanged bottom 11 adapted to be forced inside the zinc tube 10 as shown in Fig. 4. This bottom may be made leak-tight by rolling the bottom of the can through molten solder as is usual in the manufacture of dry cell cans of the ordinary type, but I prefer to weld the bottom in place by the seam welding process.

A zinc can made in this way is of great strength on account of its formation through the forcing process, so that there is less danger of breaking the can by the use of excessive force in tamping the mix in place, or by the accidental application of undue strains during the manufacture or while the cell is in use. Furthermore, the elimination of the side seam always found in cans made by overlapping a sheet of zinc, renders the can absolutely leak-proof as far as the sides of the can are concerned. Furthermore, the seam welding of the bottom in position completely closes the joint between the bottom and the zinc tube by an autogenous union. Cells made in accordance with my improved method therefore are entirely leak-proof. Furthermore, the method of manufacture is such that all labor of rolling the ordinary zinc plates into shape, soldering them in position along the overlapped edges, etc., is entirely eliminated. The cost of my improved containers is therefore materially below that of containers now in use.

Having described my invention, what I claim is:

1. The process of making dry cell containers which consists in extruding zinc into seamless tubes, cutting said tubes into sections and joining bottom members to one end of said sections.

2. The method of making dry cell containers which consists in extruding zinc into seamless tubes, cutting said tubes into sections, applying flanged bottoms in one end of said section, and seam welding the flanges to the tubes.

In testimony whereof, I hereunto affix my signature.

C. W. HAZELETT.